B. F. BRATE.
Cultivators.
No. 136,409. Patented March 4, 1873.
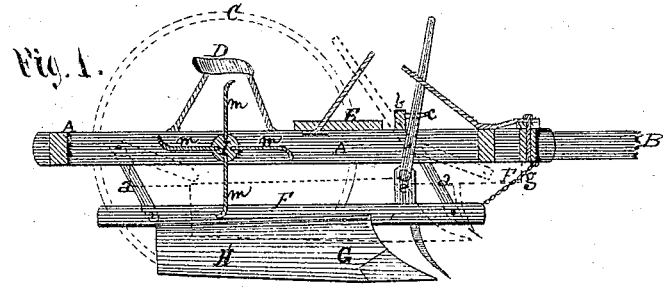
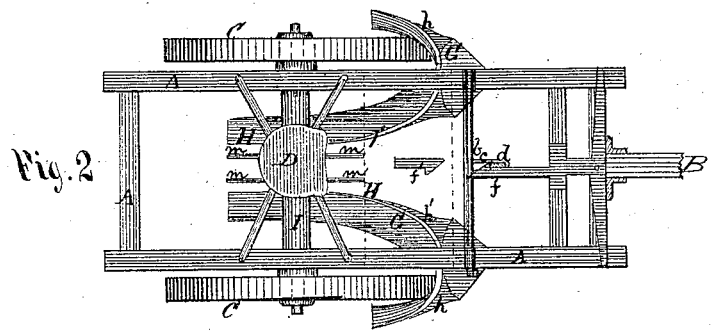
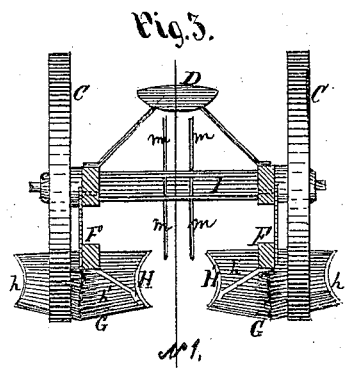
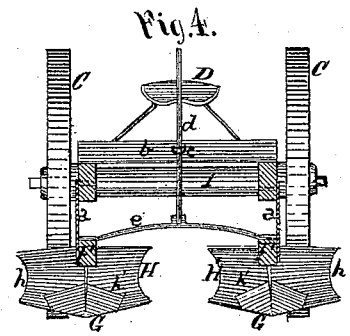

UNITED STATES PATENT OFFICE.

BALTIS F. BRATE, OF NEW SCOTLAND, NEW YORK.

IMPROVEMENT IN CULTIVATORS.

Specification forming part of Letters Patent No. 136,409, dated March 4, 1873.

*To all whom it may concern:*

Be it known that I, BALTIS F. BRATE, of the town of New Scotland, county of Albany, State of New York, have invented certain new and useful Improvements in Horse Hoeing-Machines; and I do hereby declare that the following is a description thereof, reference being had to the accompanying drawing forming a part of this specification, in which—

Figure 1 represents a side elevation of the machine embodying the improvements in this invention. Fig. 2 is a vertical view from above illustrating the same. Fig. 3 is a view from the rear of the same. Fig. 4 is a view from the front of the same.

My invention relates to a horse hoeing-machine; and consists in a certain form of plows and heaping-wings, and also in the combination of certain new and old devices, all of which are so constructed and arranged that the operator will be capable of graduating the machine to any required depth, and of finishing a row at each passage over the ground.

In the drawing, A represents any suitable frame-work for supporting the working mechanism of the machine. B is the pole or tongue. C C are the carrying-wheels. D is the driver's seat. E is the foot-board. F F are swinging beams placed beneath the frame A, and supported by the hangers $a$ $a$, pivoted as shown in Figs. 1, 3, and 4. $b$ is a roller-bar pivoted or hinged to the frame A, and is provided with the loop $c$, and is intended to serve as a fulcrum for the lever $d$, the lower end of which is pivoted to the cross-bar $e$ secured to the beams F F, as shown in Figs. 1 and 4. $f$ and $f'$ are catches which are to engage with the lever $d$ when it is moved in either direction, the catch $f$ holding said lever when the beams F F are dropped down, as shown by full-shaded lines in Fig. 1, while the catch $f'$ is to hold the said lever when it is thrown back to elevate the said beams, as shown by dotted lines in the same figure. $g$ is any suitable chain attached to the frame A and the beams F F, and is intended to draw on the said beam F and prevent its being cast too far down when force is exerted to throw it back. To the under side of each of the beams F F are secured the hoeing-wings or mold-boards G G, each of which is the duplicate of the other, except that they are constructed as right and left. The said hoeing-wings or mold-boards G G are each of them double, and consist of the outside mold-board $h$ and the inner mold-board $h'$. The heaping-wings H H are made continuous with the inner mold-board $h'$, and extend back beyond the axle I of the machine, as shown in Figs. 1 and 2. The sides of the said wings H H are each made concave on their facing sides, as shown in Figs. 3 and 4, and the said concave faces, commencing with their mold-boards $h'$ $h'$ at a considerable distance apart, approach each other as they extend back, so as to contract the space between their rear ends, and give to the said wings, when thus arranged, a funnel form, as shown in Fig. 2. By the concave form of the heaping-wings H H the earth is loosened up to near the plants, while by the funnel form of surface secured by the arrangement of the same the earth will be somewhat pressed against the hill with an equal pressure from each side; the machine straddling the row, and the heaping-wings working the soil from the furrows to each side of the row of hills, and simultaneously operating with the one and same rows of hills to finish the hoeing of the same. In my invention it is readily seen that, by acting on each side of the row of hills, the hoeing of the hills will be more perfectly performed, while the concave facing-wings will act to loosen up the earth to the full depth of the hill, and the funnel form of the surface of both wings will unite to effect a uniform pressure of the earth on each side of the hills simultaneously. Arranged between the heaping-wings H H are the revolving pickers $m$ $m$, which pickers are carried by the axle I, and are revolved by the carrying-wheels C C, or by one of them, by means of a clutch arranged with the hub of the wheel or wheels and the axle in the usual manner; the said pickers to be revolved slowly, and are intended to throw or pick the leaves or stalks of the plants out from under the soil that may be cast over them.

The manner in which it is intended to operate with this machine and its mode of operation are as follows: The horses are harnessed before the machine in the same manner as with a mower, and the row is straddled, each of the wheels traveling in the furrows on the sides of the row to be hoed. The double mold-boards G G are lowered to their required depth by the lever *d* being thrown forward and secured by the catch *f*, as shown in Fig. 1. The machine being drawn forward will cause the mold-boards G G to plow in the furrows, the outer mold-boards *h h* operating to throw the earth out from the row to be hoed toward the adjacent rows, to be subsequently hoed. The inner mold-boards *h' h'* will operate to cast their earth toward the hill straddled by the machine, which earth will be received by the wings H H, and, by their funnel-shaped form of surface, will press the earth against the hills, the upper portion or lips of the concave faces working the soil toward the plants, while the lower lips will crease the base of the hill so that the loosened soil will fall down and cover the base in a loose manner. The pickers *m m* will revolve so as to strike the loose earth that may be thrown over the plants and knock the same off, and will also come in contact with the leaves and stalks of the plants to uncover them.

The advantages attending the use of these improvements are these: The mold-boards can be set to cut any required distance in the furrows. The rows can be finished at each passing. The earth will be thoroughly loosened up at the base of the hills, while the upper portions of the same will be pressed down in an even manner.

Having described my invention, what I claim, and desire to secure by Letters Patent, is—

1. The pickers *m m*, arranged to revolve between the wings H H, substantially as and for the purpose set forth.

2. The combination of the wheels C C, pole B, frame A with the suspended beams F F carrying the double mold-boards G G and heaping-wings H H, when all are constructed and arranged substantially as and for the purpose set forth.

BALTIS F. BRATE.

Witnesses:
JAMES AINSLEIGH,
ALEX. SELKIRK.